ANHYDRO-1-[2-(2-BENZOTHIAZOLYL ETHOHYDROXIDE) VINYL]-3-INDAZOLINONE

ANHYDRO-1-[2-(2-NAPHTHO[1,2]THIAZOLYL ETHOHYDROXIDE)VINYL]-3-INDAZOLINONE

ANHYDRO-1-[4-(2-BENZOTHIAZOLYL ETHOHYDROXIDE)-1,3-BUTADIENYL]-3-INDAZOLINONE

United States Patent Office 2,961,317
Patented Nov. 22, 1960

2,961,317

HOLOPOLAR DYES DERIVED FROM 3-INDAZOLINONE

Frank G. Webster and Leslie G. S. Brooker, Rochester, N.Y., assignors to Eastman Kodak Company, Rochester, N.Y., a corporation of New Jersey Filed June 19, 1958, Ser. No. 743,068

11 Claims. (Cl. 96—102)

This invention relates to novel polymethine dyes, methods for making such dyes, and photographic silver halide emulsions sensitized by means of such polymethine dyes.

Polymethine dyes, including merocyanine dyes and cyanine dyes, have been previously described, wherein the molecule contains a variety of heterocyclic nuclei. In the past, the acidic, or electron-attracting nuclei that have been used in the preparation of such polymethine dyes, as the merocyanines, oxonols, hemioxonols, etc., have been either ketomethylene compounds, or closely-related compounds, such as malononitrile, etc.

We have now found a new class of polymethine dyes which are not merocyanine dyes because they do not contain the amidic system; rather they contain an amidinium ion system, as in the cyanine dye series, which is neutralized electrically by an anionic system. For these reasons, the new dyes of our invention are regarded as holopolar cyanine dyes.

It is, therefore, an object of our invention to provide a new class of polymethine dyes. Another object is to provide methods for making these new polymethine dyes. Still another object is to provide photographic silver halide emulsions spectrally sensitized with the new polymethine dyes of our invention. Other objects will become apparent from a consideration of the following description and examples.

Figure 1:
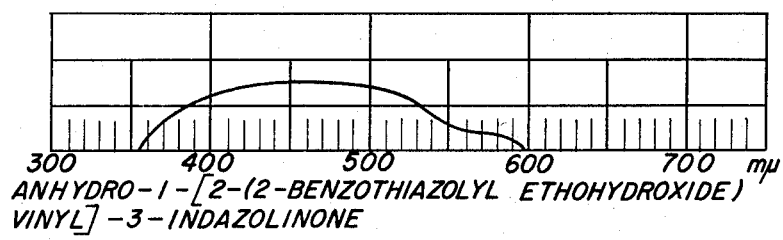
Figure 2:
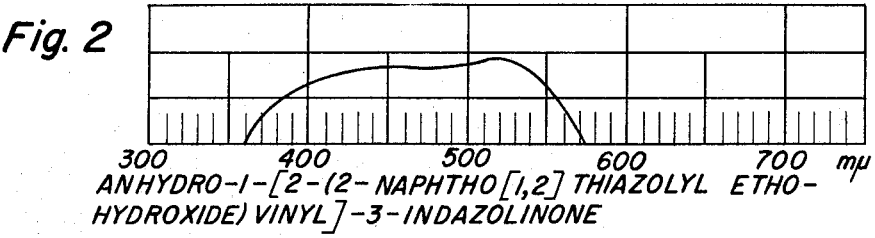
Figure 3:
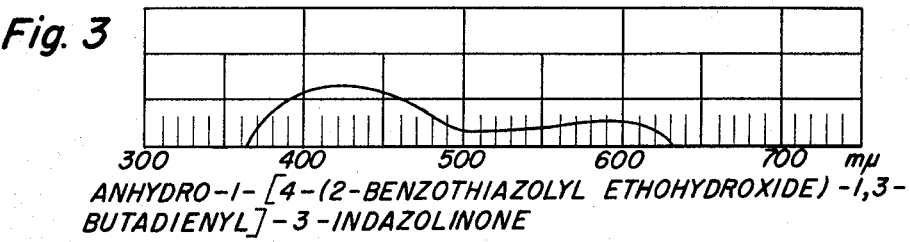

Many of the new polymethine dyes of our invention are useful in sensitizing photographic silver halide emulsions, and the effect of three of the new dyes of our invention in conventional photographic silver halide emulsions is illustrated diagrammatically in Figures 1 to 3 of the accompanying drawing. Further details regarding this effect are given below.

The new polymethine dyes of our invention can advantageously be represented by the following general formula:

I.

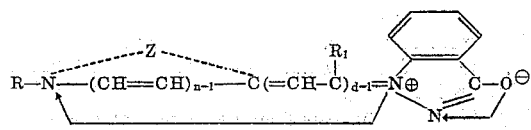

wherein R represents an alkyl group or alcohol radical (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, etc.) (especially alkyl groups containing from 1 to 4 carbon atoms), $R_1$ represents a hydrogen atom, a lower alkyl group (e.g., methyl, ethyl, etc.), or an aryl group (e.g., phenyl, o-, m- or p-tolyl, etc., especially a monocyclic aryl group of the benzene series), $d$ represents a positive integer of from 1 to 3 ( (when $d$ is 3, $R_1$ is a hydrogen atom), $n$ represents a positive integer of from 1 to 2, and Z represents the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2]-thiazole, naphtho[2,1]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7′,6′,4,5-thiazole nucleus (e.g., 4′-methoxythianaphtheno-7′,6′,4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2]oxazole, naphtho[2,1] oxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[1,2]-selenazole, naphtho[2,1]selenazole, etc.), a thiazole nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a benzimidazole nucleus (e.g., 1,3-diethylbenzimidazole, 1-ethyl-3-phenylbenzimidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), etc.

The arrows of Formula I above indicate that the positive charge can be shared by the nitrogen atom of the basic heterocyclic nucleus defined by Z and the nitrogen atom in the 1-position of the indazolinone ring, and that the negative charge can be shared by the carbonylic oxygen atom of the indazolinone ring and the nitrogen atom in the 2-position of that ring. It is apparent that the benzene ring of the indazolinone nucleus can contain simple substituents, such as chlorine, bromine, methoxyl, ethoxyl, methyl, ethyl, etc.

The dyes represented by Formula I above can advantageously be prepared by condensing a compound selected from those represented by the following general formula:

II.

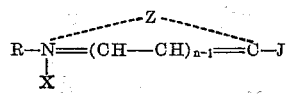

wherein R, $n$ and Z each have the values given above, X represents an acid radical, such as chloride, bromide, iodide, perchlorate, thiocyanate, benzenesulfonate, p-toluenesulfonate, methylsulfate, ethylsulfate, and J represents an electronegative group, such as:

IIa.                    

wherein $R_2$ represents an alkyl group (e.g., methyl, ethyl, etc.), or an aryl group (e.g., phenyl, tolyl, etc.), or:

IIb.                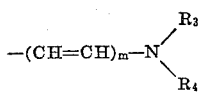

wherein m represents a positive integer of from 1 to 2, $R_3$ represents an acyl group (e.g., acetyl, propionyl, butyryl, benzoyl, etc.), and $R_4$ represents an aryl group (e.g., phenyl, tolyl, etc.), or:

IIc.                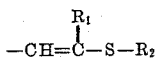

wherein $R_1$ and $R_2$ have the values given above, together with 3-indazolinone, which can be represented by the following formula:

III.                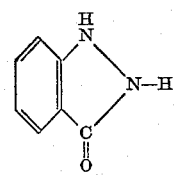

In general, the condensations of the compounds of Formula II with that of Formula III can be carried out using approximately equimolar amounts of these two intermediates. Larger amounts of one or the other of these ingredients can be employed in order to accelerate the reaction, in accordance with the law of mass action.

The condensations of the intermediates of Formula II with that of Formula III can be accelerated by the addition of conventional basic condensing agents to the reaction mixture. Typical basic condensing agents include the trialkylamines (e.g., triethylamine, tri-n-propylamine, triisopropylamine, tri-n-butylamine, triisobutylamine, etc.), N,N-dialkylanilines (e.g., N,N-dimethylaniline, N,N-diethylaniline, etc.), N-alkylpiperidines (e.g., N-methylpiperidine, N-ethylpiperidine, etc.), etc. The condensations can be carried out in the presence of an inert diluent, such as the lower alcohols (e.g., ethanol, n-propanol, isopropanol, n-butanol, etc.), 1,4-dioxane, diethyl ether, benzene, pyridine, quinoline, etc. (depending, of course, upon the solubility of the particular intermediates in these reagents). The condensations can also be accelerated by the application of heat to the reaction mixture. Temperatures varying from about room temperature (ca. 25° C.) to the reflux temperature of the reaction mixture can be employed.

The specific compound illustrated by Formula III above has been described in the prior art. This compound does not contain any reactive methylene group, nor does it have two hydrogen atoms attached to any one atom in the conventional manner of depicting the compound. However, the compound can be written as follows:

IIIa.               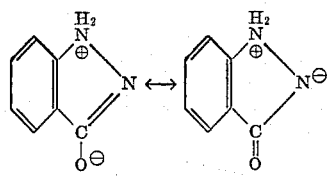

or

IIIb.               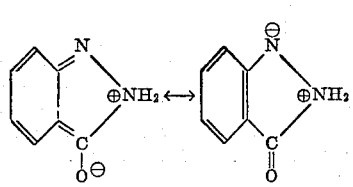

so that two hydrogen atoms are attached to one of the nitrogen atoms. Of the above two possibilities in Formula IIIb, the structure on the left-hand side with a quinonoid ring is regarded to be a less stable arrangement. Actually, it is not necessary to suppose that two hydrogen atoms must be attached to one nitrogen atom for the compound to be reactive. A proton might be lost from the structure shown in Formula III to give a reactive anion represented by the following formula:

IIIc.               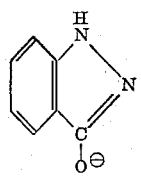

The preparation of a number of the compounds represented by Formula I above is illustrated in the following examples.

*Example 1.—Anhydro-1-[2-(2-benzoxazolyl ethohydroxide)vinyl]-3-indazolinone*

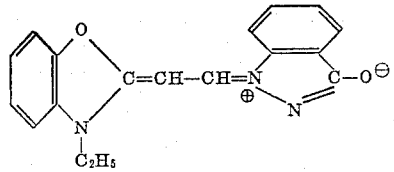

A mixture of 0.67 g. (1 mol.) of 3-idazolinone, 2.17 g. (1 mol.) of 2-(2-acetanilidovinyl)-3-ethylbenzoxazolium iodide, 15 ml. of anhydrous ethyl alcohol and 0.5 g. (1 mol.) of triethylamine was warmed on the steam bath for 2 minutes. The cool reaction mixture was stirred with ether and the whole chilled. The solid was collected on the filter and washed with ether. The product was dissolved in water, 5 ml. of 10% aqueous potassium hydroxide was added and the mixture was extracted with acetone. The actone solution was concentrated to dryness. The yield of dye was 42% crude and 39% after salting out of water with potassium carbonate. The orange crystalline powder had a M.P. of 205–207° C. with decomposition.

*Example 2.—Anhydro-1 - [2 - (2-benzothiazolyl ethohydroxide)vinyl]-3-indazolinone*

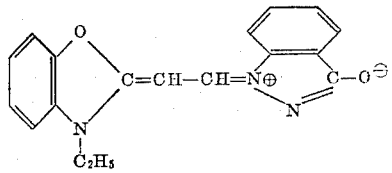

A mixture of 0.67 g. (1 mol.) of 3-indazolinone, 2.25 g. (1 mol.) of 2-(2-acetanilidovinyl) - 3 - ethylbenzothiazolium iodide, 15 ml. of anhydrous ethyl alcohol and 0.5 g. (1 mol.) of triethylamine was warmed on the steam bath for 2 minutes. The reaction mixture was chilled and the solid collected on the filter and washed with anhydrous ethyl alcohol and dried. The crude product was dissolved in 20 ml. of hot methanol, filtered, 50 ml. of warm water added, chilled and product collected. After another like treatment, the yield of dark red crystalline powder was 46% with a M.P. of 153–154° C.

*Example 3.—Anhydro - 1-[2-(2 - naphtho[1,2]thiazolyl ethohydroxide)-vinyl]-3-indazolinone*

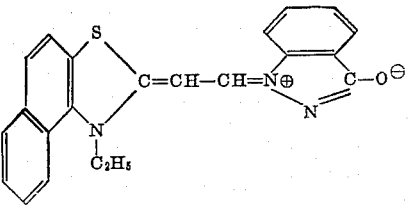

A mixture of 0.67 g. (1 mol.) of 3-indazolinone, 2.72 g. (1 mol.) of 2-(2-acetanilidovinyl) - 1 - ethylnaphtho[1,2]thiazolium p-toluenesulfonate, 0.5 g. (1 mol.) of acetic anhydride, 0.5 g. (1 mol.) of triethylamine and 15 ml. of pyridine was warmed on the steam bath for 5 minutes. Anhydrous ethyl alcohol (75 ml.) was added and the whole chilled. The solid was collected on the filter and washed sparingly with methanol. The crude product was dissolved in methanol, chilled and filtered. Water was added to the filtrate. The solid was collected on the filter, washed with water, and redissolved in methanol, and filtered while hot. Warm water was added until crystals started to form, chilled and product collected. After another like treatment, the yield of orange-red needles and golden crystals was 51% with a M.P. of 216–218° C. with decomposition.

*Example 4.—Anhydro - 1 - [2-(4-quinolyl ethohydroxide)vinyl]-3-indazolinone*

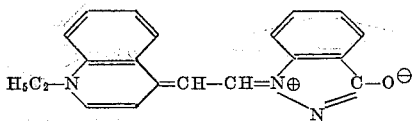

A mixture of 0.67 g. (1 mol.) of 3-indazolinone, 2.22 g. (1 mol.) of 4-(2-acetanilidovinyl)-1-ethylquinolinium iodide, 0.5 g. (1 mol.) of triethylamine and 15 ml. of anhydrous ethyl alcohol was warmed on the steam bath for 2 minutes. The mixture was chilled, the solid was collected on the filter and washed with methanol. The yield of dye was 100% crude and 47% after two recrystallizations from methanol. The dark blue needles had a M.P. of 218–219° C. with decomposition.

*Example 5.—Anhydro - 1 - [4-(2 - benzothiazolyl ethohydroxide)-1,3-butadienyl]-3-indazolinone*

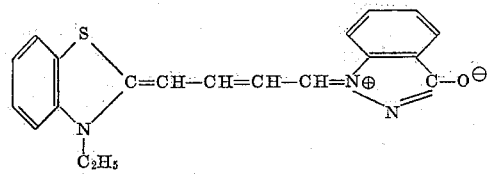

A mixture of 0.67 g. (1 mol.) of 3-indazolinone, 2.38 g. (1 mol.) of 2-(4-acetanilido-1,3-butadienyl)-3-ethylbenzothiazolium iodide, 0.5 g. (1 mol.) of triethylamine and 15 ml. of anhydrous ethyl alcohol was warmed on the steam bath for 2 minutes. The mixture was chilled, the solid was collected on the filter and washed with methanol. The yield of dye was 20% after two recrystallizations from methanol. The green crystals had a M.P. of 211–212° C. with decomposition.

*Example 6.—Anhydro - 1 - [2-(2-benzoselenazolyl ethohydroxide)vinyl]-3-indazolinone*

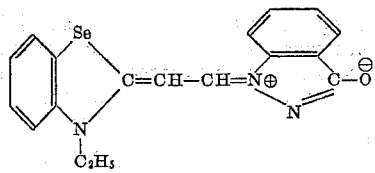

A solution of .67 g. (1 mol.) of 3-indazolinone and 1.01 g. (1 mol.+100% excess) of triethylamine in 35 ml. of anhydrous ethyl alcohol was added to a suspension of 2.69 g. (1 mol.) of 2-(2-acetanilidovinyl)-3-ethylbenzoselenazolium iodide in 15 ml. of anhydrous ethyl alcohol. The mixture was heated to the boiling point and allowed to stand, with stirring, for 15 minutes. The reaction mixture was stirred with 400 ml. of ether and the whole chilled. The solid was collected on a filter and washed with ether. The yield of dye was 11% after two recrystallizations from methanol. The reddish-brown crystals melted at 166–167° C. with decomposition.

*Example 7.—Anhydro - 1 - [2-(2-naphtho[1,2]thiazolyl methohydroxide)-1-phenylvinyl]-3-indazolinone*

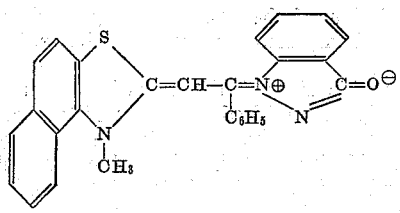

A solution of .67 g. (1 mol.) of 3-indazolinone and 1.01 g. (1 mol.+100% excess) of triethylamine in 35 ml. of anhydrous ethyl alcohol was added to a suspension of 2.6 g. (1 mol.) of 1-methyl-2-(2-methylmercaptostyryl)naphtho[1,2]-thiazolium p-toluenesulfonate in 15 ml. of anhydrous ethyl alcohol. The mixture was allowed to stand, with stirring, for 15 minutes. The reaction mixture was stirred with 400 ml. of ether and the whole chilled. The solid was collected on a filter and washed with ether. The crude product was dissolved in 25 ml. of hot methanol, the solution was filtered, 25 ml. of water was added, the mixture was chilled and the product was collected on a filter. After another like treatment, the yield was 14% and the dark needles melted at 182–184° C. with decomposition.

As indicated above, many of the dyes of our invention are particularly useful in manufacturing photographic silver halide emulsions, serving to alter the sensitivity thereof. Sensitization by means of our new dyes is, of course, directed primarily to the ordinarily-employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 200 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 200 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily-employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art.

For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily-employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen, 2,540,085, granted February 6, 1951; R. E. Damschroder, 2,597,856, granted May 27, 1952, and H. C. Yutzy et al., 2,597,915, granted May 27, 1952), various palladium compounds, such as palladium chloride (W. D. Baldsiefen, U.S. 2,540,086, granted February 6, 1951), potassium chloropalladate (R. E. Stauffer et al., U.S. 2,598,079, granted May 27, 1952), etc., or mixture of such sensitizers; antifoggants, such as ammonium chloroplatinate (A. P. H. Trivelli et al., U.S. 2,566,245, granted August 28, 1951), ammonium chloroplatinite (A. P. H. Trivelli et al., U.S. 2,566,263, granted August 28, 1951), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller, U.S. 1,763,533, granted June 10, 1930), chrome alum (U.S. 1,763,533), glyoxal (J. Brunken, U.S. 1,870,354, granted August 9, 1932), dibromacrolein (O. Block, et al., Br. 406,750, accepted March 8, 1934), etc.; color couplers, such as those described in I. F. Salminen et al., U.S. Patent 2,423,730, granted July 7, 1947, Spence and Carroll, U.S. Patent 2,640,776, issued June 2, 1953, etc.; or mixtures of such addenda. Dispersing agents for color couplers, such as those set forth in U.S. patents to E. E. Jelley et al., 2,322,027, granted June 15, 1943, and L. D. Mannes et al., 2,304,940, granted December 15, 1942, can also be employed in the above-described emulsions.

The sensitizing effect of several of the new dyes of our invention is illustrated in the following tabulation where the sensitizing range and maximum for several of the dyes are illustrated. The results were obtained from an ordinary photographic gelatino-silver-bromiodide emulsion.

| Example | Maximum | Range |
|---|---|---|
| 2 | 510 mµ, and 590 mµ | to 610 mµ |
| 3 | 545 mµ | to 580 mµ |
| 4 | (1) | to 600 mµ |
| 5 | 590 mµ | to 630 mµ |

[1] No definite maximum.

The accompanying drawing further illustrates our invention. Each figure is a diagrammatic reproduction of a spectrogram showing the sensitivity of an ordinary gelatino-silver-bromiodide emulsion containing one of our new sensitizing dyes. In Figure 1, the curve depicts the sensitivity of an ordinary gelatino-silver-bromiodide emulsion containing anhydro-1-[2-(2-benzothiazolyl ethohydroxide)vinyl]-3-indazolinone. The preparation of this dye is illustrated in Example 2 above. In Figure 2, the curve depicts the sensitivity of an ordinary gelatino-silver-bromiodide emulsion containing anhydro-1-[2-(2-naphtho[1,2]-thiazolyl ethohydroxide)vinyl]-3-indazolinone. The preparation of this dye is illustrated in Example 3 above. In Figure 3, the curve depicts the sensitivity of an ordinary gelatino-silver-bromiodide emulsion containing anhydro-1-[4-(2-benzothiazolyl ethohydroxide)-1,3-butadienyl]-3-indazolinone. The preparation of this dye is illustrated in Example 5 above.

The invention has been described in detail with particular reference to preferred embodiments thereof, but it will be understood that variations and modifications can be effected within the spirit and scope of the invention as described hereinabove and as defined in the appended claims.

What we claim as our invention and desire secured by Letters Patent of the United States is:

1. A photographic silver halide emulsion sensitized with a holopolar dye selected from those represented by the following general formula:

I.

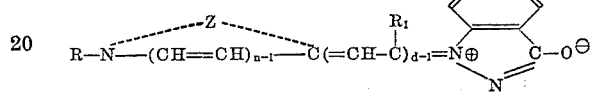

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, $d$ represents a positive integer of from 1 to 3, $n$ represents a positive integer of from 1 to 2 and Z represents the non-metallic atoms necessary to complete a heterocyclic nucleus selected from the class consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkylindolenine nucleus, a 2-pyridine nucleus and a 4-pyridine nucleus, provided that $R_1$ represents a hydrogen atom when $d$ is 3 and $n$ is 2 when Z represents the non-metallic atoms necessary to complete a heterocyclic nucleus selected from the class consisting of a 4-quinoline nucleus and a 4-pyridine nucleus and $n$ is 1 in all other instances.

2. A photographic silver halide emulsion as defined in claim 1 wherein the silver halide is silver bromiodide.

3. A photographic silver halide emulsion sensitized with a holopolar dye selected from those represented by the following general formula:

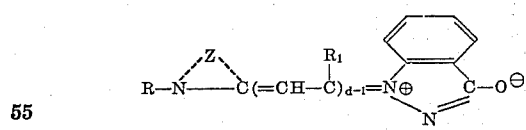

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, $d$ represents a positive integer of from 1 to 3 and Z represents the non-metallic atoms necessary to complete a benzoxazole nucleus, provided that $R_1$ represents a hydrogen atom when $d$ is 3.

4. A photographic silver halide emulsion containing the holopolar dye represented by the following formula:

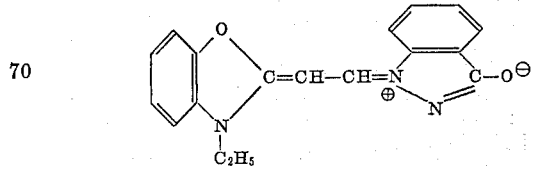

5. A photographic silver halide emulsion sensitized with a holopolar dye selected from those represented by the following general formula:

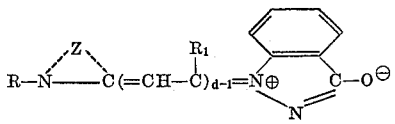

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, $d$ represents a positive integer of from 1 to 3 and Z represents the non-metallic atoms necessary to complete a benzothiazole nucleus, provided that $R_1$ represents a hydrogen atom when $d$ is 3.

6. A photographic silver halide emulsion containing the holopolar dye represented by the following formula:

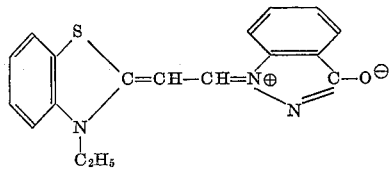

7. A photographic silver halide emulsion sensitized with a holopolar dye selected from those represented by the following general formula:

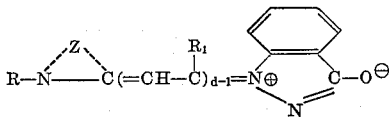

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, $d$ represents a positive integer of from 1 to 3 and Z represents the non-metallic atoms necessary to complete a naphthothiazole nucleus, provided that $R_1$ represents a hydrogen atom when $d$ is 3.

8. A photographic silver halide emulsion containing the holopolar dye represented by the following formula:

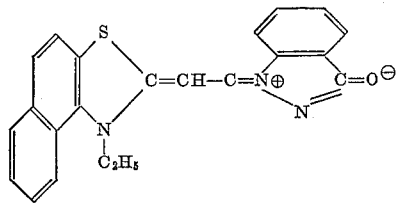

9. A photographic silver halide emulsion containing the holopolar dye represented by the following formula:

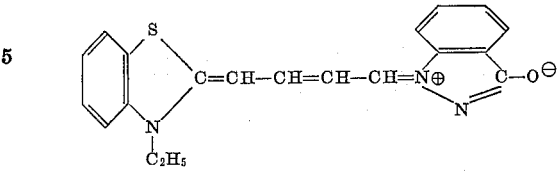

10. A photographic silver halide emulsion sensitized with a holopolar dye selected from those represented by the following general formula:

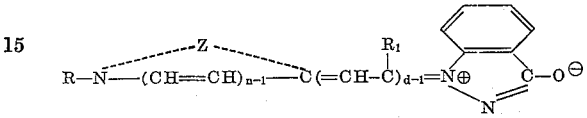

wherein R represents an alkyl group containing from 1 to 4 carbon atoms, $R_1$ represents a member selected from the group consisting of a hydrogen atom, an alkyl group containing from 1 to 2 carbon atoms and a monocyclic aryl group of the benzene series, $d$ represents a positive integer of from 1 to 3, $n$ represents a positive integer of from 1 to 2, and Z represents the non-metallic atoms necessary to complete a quinoline nucleus, provided that $R_1$ represents a hydrogen atom when $d$ is 3.

11. A photographic silver halide emulsion containing the holopolar dye represented by the following formula:

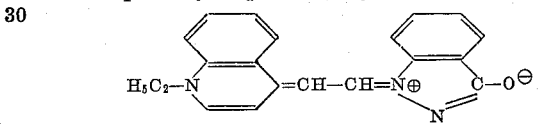

References Cited in the file of this patent

UNITED STATES PATENTS

| | | |
|---|---|---|
| 2,153,930 | Kendall | Apr. 11, 1939 |
| 2,263,749 | White et al. | Nov. 25, 1941 |
| 2,289,303 | Dieterle et al. | July 7, 1942 |
| 2,572,961 | Thompson | Oct. 30, 1951 |

OTHER REFERENCES

Chemical Abstracts 16, 3101 (Abstract of Brit. Med. Journal, 1922, I, 514–15).

Chemical Abstracts 19, 530 (Abstract of Proc. Roy. Soc., London, 96B, 317–33, 1924).

UNITED STATES PATENT OFFICE

Certificate of Correction

Patent No. 2,961,317

November 22, 1960

Frank G. Webster et al.

It is hereby certified that error appears in the above numbered patent requiring correction and that the said Letters Patent should read as corrected below.

Column 1, line 63, for "((when $d$ is 3," read —(when $d$ is 3,—; column 4, line 38, for "actone" read —acetone—; lines 46 to 52, the left-hand portion of the formula should appear as shown below instead of as in the patent:

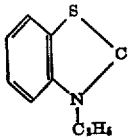

column 6, lines 5 to 11, the right-hand portion of the formula should appear as shown below instead of as in the patent:

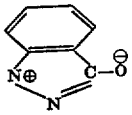

column 9, lines 45 to 55, the formula should appear as shown below instead of as in the patent:

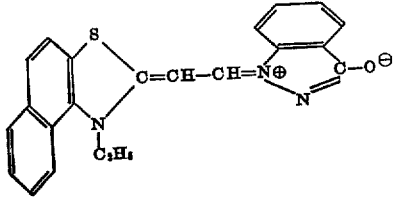

Signed and sealed this 20th day of June 1961.

[SEAL]

Attest:
ERNEST W. SWIDER,
Attesting Officer.

DAVID L. LADD,
Commissioner of Patents.